(12) United States Patent
Machida et al.

(10) Patent No.: US 8,409,706 B2
(45) Date of Patent: Apr. 2, 2013

(54) PREPARATION PROCESS OF MICROBEADS, AND MICROBEADS

(75) Inventors: Kenzo Machida, Tokyo (JP); Noriyuki Kishii, Kanagawa (JP); Mari Ichimura, Kanagawa (JP); Masanobu Tanaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 784 days.

(21) Appl. No.: 12/432,108

(22) Filed: Apr. 29, 2009

(65) Prior Publication Data

US 2009/0274908 A1    Nov. 5, 2009

(30) Foreign Application Priority Data

May 2, 2008    (JP) ................. 2008-120121
Aug. 15, 2008    (JP) ................. 2008-209147

(51) Int. Cl.
*B32B 1/00*    (2006.01)
*G03F 7/20*    (2006.01)

(52) U.S. Cl. ........................ 428/403; 430/322

(58) Field of Classification Search .................. None
See application file for complete search history.

(56) References Cited

U.S. PATENT DOCUMENTS

| | | |
|---|---|---|
| 5,474,796 A | 12/1995 | Brennan |
| 6,028,189 A | 2/2000 | Blanchard |
| 6,107,102 A | 8/2000 | Ferrari |
| 6,268,222 B1 | 7/2001 | Chandler et al. |
| 7,407,746 B2 | 8/2008 | Hirota et al. |
| 2003/0153092 A1 | 8/2003 | Skinner et al. |

FOREIGN PATENT DOCUMENTS

| | | |
|---|---|---|
| GB | 2306484 | 5/1997 |
| GB | 2344347 | 8/1999 |
| GB | 2422686 | 8/2006 |
| JP | 2001-004631 | 1/2001 |
| JP | 2001-518086 | 10/2001 |
| JP | 3468750 | 9/2003 |
| JP | 2004-501344 | 1/2004 |
| JP | 2006-017554 | 1/2006 |
| JP | 3808313 | 5/2006 |
| JP | 2006-153532 | 6/2006 |
| JP | 3922454 | 3/2007 |
| WO | 00/53310 | 9/2000 |
| WO | WO 01/78889 A2 * | 10/2001 |
| WO | 02059603 | 8/2002 |

OTHER PUBLICATIONS

Zong et al. (Sep. 10, 2004) Langmuir vol. 20 pp. 9210 to 9216.*
Reltek LLC 2006 adhesives for fluoropolymers (downloaded Jul. 23, 2012 from http://www.reltekllc.com/adhesives-for-fluoropolymers.html) p. 1.*
Cavalli Gabriel, et al, "Multistep Synthesis on SU-8: Combining Microfabrication and Solid-Phase Chemistry on a Single Material," Journal of Combinatorial Chemistry May-Jun. 2007, vol. 9, No. 3, pp. 462-472.

(Continued)

*Primary Examiner* — Ardin Marschel
*Assistant Examiner* — Christian Boesen
(74) *Attorney, Agent, or Firm* — K&L Gates, LLP

(57) ABSTRACT

The present application provides a process for the preparation of microbeads, including the steps of: patterning a thin film, which has been formed on a substrate, into microbead regions of at least one predetermined shape by photolithography; immobilizing a predetermined substance on the thus-patterned microbead regions; and stripping off, from the substrate, the thus-patterned microbead regions with the substance immobilized thereon.

10 Claims, 6 Drawing Sheets

OTHER PUBLICATIONS

European Search Report for corresponding Application No. 09005182.2, dated Aug. 24, 2009.
Lausted, C. et al., "POSaM: a fast, flexible, open-source, inkjet oligonucleotide synthesizer and microarrayer," Genome Biology, vol. 5, pp. R58-2-R58-17, 2004.

Pregibon, D. C. et al., "Multifunctional Encoded Particles for High-Throughput Biomolecule Analysis," Science, vol. 315, pp. 1393-1396, 2007.
Richmond, K. E. et al., "Amplification and assembly of chip-eluted DNA (AACED): a method for high-throughput gene synthesis," Nucleic Acids Research, vol. 32, pp. 5011-5018, 2004.

* cited by examiner (SEQ ID NO: 4)

(SEQ ID NO: 5)

(SEQ ID NO: 6)

PREPARATION PROCESS OF MICROBEADS, AND MICROBEADS

CROSS REFERENCES TO RELATED APPLICATIONS

The present application claims priority to that disclosed in Japanese Priority Patent Application JP 2008-120121 filed in the Japan Patent Office on May 2, 2008, and Japanese Priority Patent Application JP 2008-209147 filed in the Japan Patent Office on Aug. 15, 2008, the entire contents of which is hereby incorporated by reference.

BACKGROUND

This present application relates to a preparation process of microbeads and also to microbeads. More specifically, the present application is concerned with a process for preparing microbeads with a predetermined substance immobilized on their surfaces by conducting photolithography on a substrate and also with the microbeads so prepared.

In a biochemical analysis for a nucleic acid, protein or the like, a particulate carrier called "microbeads" has been used in related art. In a nucleic acid analysis, for example, microbeads with probe nucleic acid chains, which have a complementary base sequence to target nucleic acid chains, immobilized thereon are used, and the target nucleic acid chains are isolated based on an interaction between the target nucleic acid chains and the probe nucleic acid chains. In a protein analysis, on the other hand, a target protein is similarly isolated using microbeads on surfaces of which an antibody to the target protein is immobilized.

Concerning biochemical analyses making use of these microbeads, there is an outstanding demand in recent years toward still higher throughputs, resulting in the increasing development of technologies for achieving the speed-up of analyses.

For example, Japanese Patent No. 3468750 (hereinafter referred to as Patent Document 1) discloses: "A method of detecting a plurality of analytes in a sample, each of said analytes being recognized by a respective analytical reactant, including: a) contacting the sample with a plurality of populations of fluorescent particles, each population of said particles having a distinct fluorescent signal and a distinct analytical reactant, wherein said analytical reactant specifically binds one of the analytes in said sample, each fluorescent particle including at least one nanoparticles labeled with a respective fluorescent dye; b) adding the sample to a label reagent; c) analyzing the particles to detect said label, which indicates the binding of the analyte to the analytical reactant; and simultaneously, d) determining the populations of particles having bound the respective analyte as a function of the distinct fluorescent signal associated with each said population" (see claim 23).

With the "Suspension Array Technology" furnished by Luminex Corporation on the basis of the above-described technology, it is possible to identify a maximum of as many as 100 types of microbeads by labeling the microbeads with two kinds of fluorescent dyes (hereinafter referred to as "fluorochromes") while providing variations in the color of emission. According to the "Suspension Array Technology," 100 kinds of different nucleic acid chains or proteins can be isolated and detected at the same time in a single analysis by immobilizing different probe nucleic chains or antibodies on 100 sets of microbeads, respectively.

Patent Document 1 in the above also describes: "said populations of fluorescent particles are further determined according to their size or shape" (see claim 25). This patent publication also discloses to the effect that the size or shape of the particle can be adopted as an additional distinction parameter (see paragraph [0037], etc.). In connection with the foregoing, a method for preparing a multiplicity of sets of microbeads of different shapes by photolithography in a microfluidic channel is described in "Multifunctional Encoded Particles for High-Throughput Biomolecule Analysis," Science, 315(5817), 1393-6 (9 Mar. 2007) (hereinafter referred to as Unexamined Document 1). According to this method, over a million sets of microbeads can be prepared.

SUMMARY

Such a superwide variety of microbeads different in fluorescence characteristics or shape as disclosed in the Patent Document 1 or the Unexamined Document 1 referred to in the above, subsequent to the immobilization of different probe nucleic acid chains or antibodies thereon, are combined together and are then used as a bead set. The bead set and a sample, which contains target nucleic acid chains or the like, are mixed together, and subsequent to rinsing, the individual microbeads and the target nucleic acid chains or the like captured on their surfaces are detected based on optical, magnetic or electrical signals.

To obtain high analytical accuracy in the above-described detection, the populations of the respective sets of microbeads contained in the bead set needs to be known exactly. For example, upon making a comparison in signal intensity between two sets of microbeads as a simplest example, the signal intensities obtained from the two sets of microbeads, respectively, cannot be compared with each other unless the populations of the respective sets of microbeads are known. To conduct an accurate comparative analysis of signal intensities in the foregoing case, the respective sets of microbeads need to be contained in the same population, or otherwise, their population ratio needs to be known beforehand.

The populations of respective sets of beads have heretofore been controlled by quantifying the individual microbeads on the basis of their weights or absorbance levels after their production and then combining them together. However, this method cannot exactly control the populations of the respective sets of microbeads and leads to variations in population, thereby posing an impediment in obtaining high analytical accuracy.

It is desirable to provide a provision of a process for the preparation of microbeads, which can furnish, as the microbeads, a bead set containing a multiplicity of sets of microbeads, the populations of which are known exactly.

An embodiment of the present application provides a process for the preparation of microbeads, including the following steps: patterning a thin film, which has been formed on a substrate, into microbead regions of at least one predetermined shape by photolithography; immobilizing a predetermined substance on the thus-patterned microbead regions; and stripping off, from the substrate, the thus-patterned microbead regions with the substance immobilized thereon. According to this microbead preparation process, sets of desired multishape microbeads can be prepared in desired populations, respectively, by designing the shapes, sizes and numbers of exposure apertures or the like in a photomask to be used in photolithography.

In this microbead preparation process, it is desired to conduct the formation of the thin film after stacking a sacrificial layer, which can be physically or chemically etched in the stripping step, on the substrate. The formation of the thin film as an upper layer on the sacrificial layer can facilitate the stripping of the thin film, that is, the microbead regions in the stripping step.

In the microbead preparation process, a water-repellent treatment may desirably be applied to substrate regions between the thus-patterned microbead regions before the immobilization step. The water-repellent treatment can prevent solutions, which are to be dropped onto the surfaces of the microbead regions after the patterning step, from mixing each other so that the desired substances can be immobilized on the individual microbeads, respectively.

Further, the immobilization step may be conducted by chemical synthesis of the substance on the microbead regions. As the substance, a biological macromolecule selected from a nucleic acid of a predetermined sequence, a peptide or a sugar chain may be immobilized.

In the microbead preparation process, it is suited that the thin film has been formed of a photoresist or silicon dioxide. The sacrificial layer may be formed of a fluorinated organic material layer, may be formed by subjecting a surface of the substrate to a treatment with a coupling agent, or may be of a metal oxide layer.

When the sacrificial layer is formed of the fluorinated organic material layer, the patterned microbead regions can be stripped off from the substrate by causing the fluorinated organic material layer to sublimate or dissolving it with a fluorinated solvent.

Another embodiment of the present application also provides microbeads obtained by the above-described microbead preparation process. Preferably, these microbeads have a three-dimensional shape provided with two faces opposing each other and extending substantially in parallel with each other, and the predetermined substance is immobilized on only one of the two faces.

In an embodiment, the term "substance" to be immobilized on the thin film, that is, the microbeads should include a wide variety of substances which can interact with target nucleic acids, target proteins or the like as analysis targets in a biochemical analysis making use of microbeads. Particularly suitably, this substance may be a biological macromolecule selected from a nucleic acid of a predetermined sequence, a peptide or a sugar chain, and include molecules capable of interacting with target nucleic acids or the like. When "the biological macromolecule" is a nucleic acid, the nucleic acid is a nucleic acid having a predetermined base sequence. Further, the term "interaction" means the formation of a double strand between nucleic acids having complementary base sequences. When "the biological macromolecule" is a peptide, the peptide is a peptide of a predetermined amino acid sequence. In this case, the term "interaction" means a protein-protein binding such as, for example, the binding between an acceptor protein and a ligand protein or the binding between an antigen and an antibody. When "the biological macromolecule" is a sugar chain, the sugar chain is a linked chain of monosaccharide units, or one formed as a result of further binding of a lipid or protein to the linked chain, such as an oligosaccharide, glycolipid or glycoprotein. In addition, this term "substance" also includes various compounds in the form of small molecules. These compounds can bind to target nucleic acids, target proteins or the like as targets of a biochemical analysis, can promote or inhibit the functions of nucleic acids or proteins, and are useful as so-called "seed compounds" in the area of drug developments. It is also to be noted that in the embodiment, the term "nucleic acid" can also embrace, in addition to DNAs (Deoxyribo Nucleic Acid) and RNAs (Ribo Nucleic Acid), nucleic acid analogs (e.g., LNAs (Locked Nucleic Acids)) obtainable by modifying the structures of their ribose moieties.

According to the microbead preparation process of an embodiment, it is possible to provide a bead set which includes a wide variety of sets of microbeads in predetermined populations. This bead set can be used in various biochemical analyses making use of microbeads, and makes it possible to obtain comparative analysis results of high reliability, for example, in a comprehensive comparative analysis of gene expression levels or protein expression levels.

Additional features and advantages are described herein, and will be apparent from the following Detailed Description and the figures.

BRIEF DESCRIPTION OF THE FIGURES

FIG. 8C is an illustration of an a target oligo DNA-3.

DETAILED DESCRIPTION

The present application will be described below in greater detail with reference to the drawings according to an embodiment.

1. Microbeads and Bead Set

Figure 1:
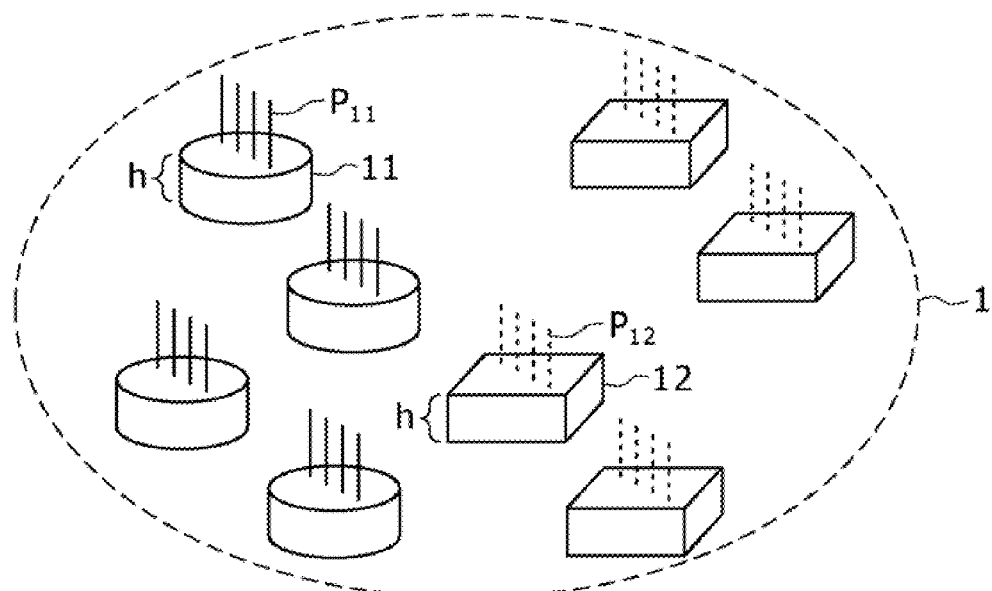
FIG. 1 is a schematic diagram illustrating microbeads and a bead set obtainable by the microbead preparation process according to an embodiment.

Referring first to FIG. 1, a description will be made of microbeads and a bead set obtainable by the microbead preparation process according to an embodiment.

In FIG. 1, the bead set designated at numeral 1 includes of two sets of microbeads, that is, a set of flattened, substantially cylindrical microbeads 11 and a set of flattened, substantially rectangular microbeads 12. Microbeads obtainable by the microbead preparation process according to an embodiment each have a three-dimensional shape equipped with two faces opposing each other and extending substantially in parallel with each other as shown in FIG. 1.

The microbeads 11 and microbeads 12 are different from each other in overall shape, and based on this difference in shape, they can be discriminated from each other by a general image recognition section. In the bead set 1, these microbeads 11 and microbeads 12 are included in predetermined numbers, respectively (i.e., four microbeads 11 and four microbeads 12 in FIG. 1).

As described above, each microbead set obtainable by the microbead preparation process according to this embodiment is characterized in that it includes plural sets of microbeads, which are different from one set to the other in shape, in predetermined numbers, respectively, and the numbers of the microbeads in the respective plural sets are known exactly.

The numbers of the microbeads of the respective shapes, which are included in the bead set 1, can be set to desired numbers, respectively. Although the two sets of microbeads, one set having the flattened, substantially cylindrical shape and the other the flattened, substantially rectangular shape, are illustrated as many as four per set for the sake of simplicity in FIG. 1, three or more sets of microbeads may be included in the bead set 1, and the numbers of the microbeads in the respective plural sets may be different from each other. Further, the shapes of the microbeads in the respective plural sets may be different designed as desired, insofar as they can be discriminated from one set to the other by a general image recognition section.

On the surface of each microbead 11, a biological macromolecule, such as a nucleic acid, peptide or sugar chain, or a micromolecule (hereinafter called "a nucleic acid or the like") designated at sign $P_{11}$ is immobilized as shown in FIG. 1. The microbead 11 is characterized in that such a substance is immobilized on only one (the upper face in the figure) of two faces, which face each other and extend substantially in parallel with each other, out of its faces.

The nucleic acid or the like $P_{11}$ can have a predetermined base sequence or amino acid sequence depending on the analysis target. As an alternative, the nucleic acid or the like $P_{11}$ can be a sugar chain or a suitable compound. A description will hereinafter be made centering around a case that a nucleic acid or peptide is used as the nucleic acid or the like $P_{11}$.

When the analysis target is a nucleic acid, for example, nucleic acid chains having a base sequence complementary to those of the target nucleic acid are immobilized as the nucleic acid or the like $P_{11}$. The chains of the target nucleic acid in a sample can, therefore, be captured and isolated on the microbeads 11 through the hybridization (the formation of double stands) between the chains of the target nucleic acid in the sample and the nucleic acid or the like $P_{11}$. It is to be noted that the number of bases in (the length of) each chain of the nucleic acid or the like $P_{11}$ is optional, each chain of the nucleic acid or the like $P_{11}$ has a base sequence complementary to at least a part of the base sequence of each chain of the target nucleic acid, and no particular limitation is imposed on the number of the bases in the nucleic acid or the like $P_{11}$ insofar as the formation of a double strand is feasible. In general, the number of the bases in each chain of the nucleic acid or the like $P_{11}$ may range from several bases to several tens of bases, with 10 bases to 30 bases or so being preferred.

When the analysis target is a protein, for example, a peptide (for example, a partial amino acid sequence of a ligand protein) capable of undergoing an interaction with the target protein (for example, a receptor protein) is immobilized as the nucleic acid or the like $P_{11}$. The target protein in a sample can, therefore, be captured and isolated on the microbeads 11 through an interaction with the nucleic acid or the like $P_{11}$.

On the surface of each microbead 12, on the other hand, a nucleic acid or the like designated at sign $P_{12}$ is immobilized as shown in FIG. 1. The nucleic acid or the like 12 can also be a predetermined base sequence or amino acid sequence depending on the nucleic acid or protein as an analysis target, or can also be a sugar chain or a suitable compound. In the microbead 12, such a substance is also immobilized on only one (the upper face in the figure) of two faces, which face each other and extend substantially in parallel with each other, out of its faces.

Using different substances such as, for example, nucleic acids or peptides of different base sequences or amino acid sequences as the nucleic acid or the like $P_{11}$ to be immobilized on the surfaces of the microbeads 11 and the nucleic acid or the like $P_{12}$ to be immobilized on the surfaces of the microbeads 12, different target nucleic acids, different target proteins, or the like can be captured or isolated on the respective sets of the microbeads.

By detecting the different target nucleic acids or target peptides, which have been captured and isolated on the microbeads 11 and 12, in accordance with an optical detection based on fluorochrome labeling or the like and simultaneously discriminating the microbeads 11 and 12 with an image recognition section, the two types of target nucleic acids, target proteins, or the like can be simultaneously analyzed.

When conducting a single nucleotide polymorphism (SNP) analysis, for example, the base sequence of the nucleic acid or the like $P_{11}$ is configured to correspond to one of two SNPs, while the base sequence of the nucleic acid or the like $P_{12}$ is configured to correspond to the other SNP. The SNP ratio of nucleic acid contained in a sample can be determined by mixing the bead set with the sample and comparing a signal (for example, a fluorescent signal intensity) on the microbeads 11 with a signal on the microbeads 12.

As has been described above, a bead set is composed of plural sets of microbeads of different shapes, on which nucleic acids or peptides of different base sequences or amino acid sequences are immobilized, respectively. This bead set makes it possible to simultaneously analyze plural target nucleic acids or proteins contained in a sample.

To obtain high analysis accuracy in the above-described analysis, the numbers of the sets of microbeads contained in the bead set need to be known exactly as described above. If the populations of the respective microbeads 11 and 12 in the bead set 1 are unknown, for example, in the above-described SNP analysis, the SNP ratio of nucleic acid in the sample cannot be precisely determined by comparing signals obtained from the respective sets of microbeads.

In this respect, with the bead set 1 in which the numbers of the plural sets of microbeads of the different shapes are known exactly, the numbers of the microbeads 11 and microbeads 12 can be precisely brought into agreement with each other, in other wise, can be set equal to each other, and by precisely comparing signals obtained from the respective sets of microbeads, high analysis accuracy can be obtained.

2. Preparation Process of Microbeads

Figure 2:
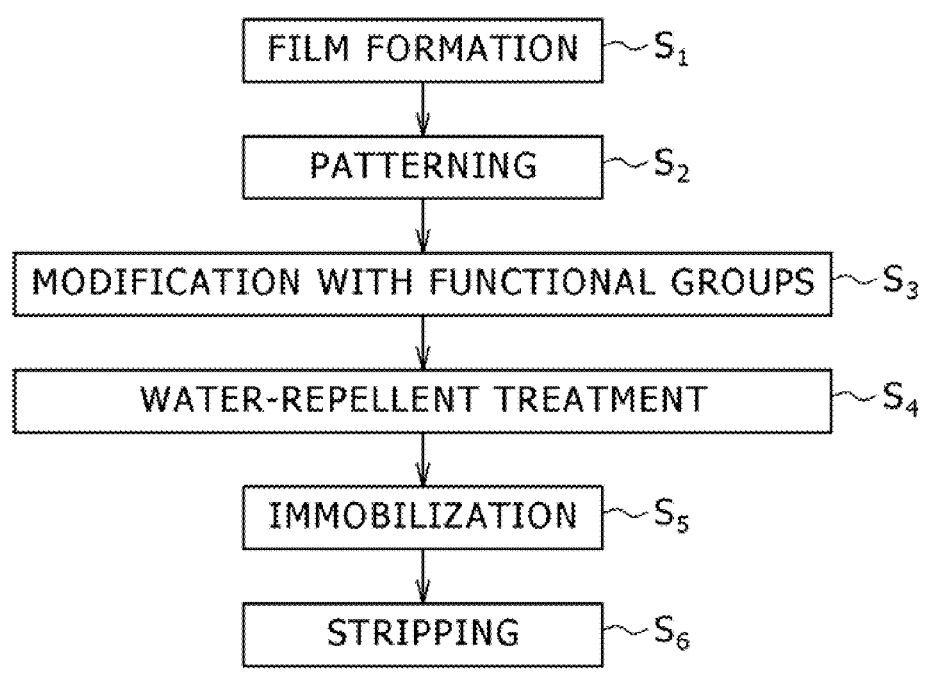
FIG. 2 is a flow chart showing the procedure of the microbead preparation process according to another embodiment.

With reference to FIG. 2, a description will hereinafter be made about a process for preparing these microbeads as a bead set.

(1) Film Formation Step (A) Formation of Thin Film

In FIG. 2, a "film formation step" designated at sign $S_1$ is a step that forms on a substrate a thin film to be used as a material for microbeads.

As the substrate, a glass substrate, a silicon substrate or the like is used, for example. No particular limitation is imposed on the material of the substrate, and materials useful in general lithographic technologies can each be adopted as desired.

On such a substrate, a thin film of a suitable polymer, silicon dioxide or a metal (aluminum, chromium, gold, silver or the like) is formed. This film formation can be conducted by a traditionally-known suitable method, such as coating by a spin coater, slit coater or spraying machine, or vapor deposition such as physical vapor deposition (PVD) or chemical vapor deposition (CVD), depending on the material for the thin film. The thickness of the thin film should be set appropriately depending on the thickness of microbeads to be prepared (see sign h in FIG. 1).

As the material for the thin film, a photoresist such as an epoxy resist (e.g., SU-8), polyimide resist, acrylic resist or novolak resist can be suitably adopted. The use of a photoresist polymer thin film makes it possible to prepare microbeads at lower cost and with lower specific gravity compared with the use of a silicon dioxide thin film or a metal thin film. Upon conducting an analysis, microbeads are mixed with a sample and are dispersed in a liquid phase. If the specific gravity of the microbeads is high, they cannot remain dispersed for a long time in the liquid phase.

As the polymer, the adoption of SU-8 is particularly preferred. SU-8 is a chemically-amplified, epoxy-base, negative resist. SU-8 was developed by International Business Machines Corporation, U.S.A. as a material for forming microstructures by combining a technology for forming an ultrathin film from a resist with a photolithographic technology.

SU-8 permits easy thickness control through the formation of a film by spin coating. Further, SU-8 has optical transparency, and is equipped with dissolution resistance to various solvents, acids and alkalis and also with temperature resistance. Accordingly, the use of SU-8 makes it possible to easily prepare microbeads of various thickness. Furthermore, SU-8 makes it possible to obtain stable performance in the preparation step of microbeads and also in an analytical operation making use of the microbeads.

(B) Stacking of Sacrificial Layer

Before the above-described formation of the thin film, a sacrificial layer, which can be physically or chemically etched in a stripping step (6) to be described subsequently herein, may desirably be stacked on the substrate. The formation of the thin film as an upper layer over the sacrificial layer makes it possible to facilitate the stripping of the thin film in the stripping step.

The sacrificial layer can be formed by stacking, for example, a fluorinated organic material layer on the substrate, subjecting a surface of the substrate to a treatment with a coupling agent, or stacking a metal oxide layer on the substrate. For the formation of the fluorinated organic material layer, a fluorine derivative of triazine, a fluorine derivative of a condensed aromatic, a fluorine derivative of adamantine, or the like can be used as an illustrative low molecular. As an alternative, a fluorine resin such as a completely fluorinated resin, partially fluorinated resin or fluorine-containing light-curing resin can be used as an illustrative high molecular material. Such a fluorinated organic material can be formed into a film by dissolving it in a solvent, spin-coating the resulting solution, and then conducting drying or light-curing.

Usable examples of the coupling agent include silane compounds, titanium compounds, zirconium compounds, and the like. The metal oxide layer can be formed by subjecting MgO, $Nb_2O_5$, $Ta_2O_5$, $WO_3$, $TiO_2$, $Al_2O_3$, $CrO_3$, $Y_2O_3$, $ZrO_2$ or the like to vapor deposition processing or sputtering.

By chemical solutions used in the various steps for the preparation of beads or the immobilization step of nucleic acids or the like before the stripping step, the sacrificial layer preferably should not be etched or otherwise damaged to such an extent that the beads on the substrate are stripped off.

Further, the sacrificial layer can preferably be etched in the stripping step without modifying or liberating the nucleic acids or the like immobilized on the microbeads. If the nucleic acids or the like immobilized on the microbeads are modified, damaged or liberated, the target nucleic acids, target proteins or the like cannot be captured on the beads. Employed as the sacrificial layer is, therefore, one capable of being etched while allowing the nucleic acids or the like immobilized on the microbeads to retain their ability to interact with the target nucleic acids, target proteins or the like, respectively.

Specifically, it is preferred to form the sacrificial layer by the above-described fluorinated organic material layer. As the fluorination degree of a fluorinated organic material becomes higher, the fluorinated organic material becomes hardly soluble in water and organic solvents and is soluble only in fluorinated solvents. When the sacrificial layer is formed by the fluorinated organic material layer, the sacrificial layer is not etched or damaged by the chemical solutions used in the various steps for the preparation of the beads or the immobilization step of the nucleic acids or the like before the stripping step.

Further, a fluorinated solvent has properties that it can be hardly mixed with high molecular materials having charges and it can hardly dissolve high molecular materials other than fluorinated high molecular materials. The nucleic acids or the like immobilized on the microbeads are hence not modified, damaged or liberated when the sacrificial layer is formed by a fluorinated organic material layer and the sacrificial layer is etched with a fluorinated solvent in the stripping step. Further, the use of a low molecular material such as a fluorine derivative of triazine as the fluorinated organic material layer allows the nucleic acids or the like, which are immobilized on the microbeads, to more surely retain their ability to interact with the target nucleic acids, target proteins or the like, because the microbeads can be stripped off by causing the fluorinated organic material layer to sublimate in the stripping step.

The preferred fluorination degree of the fluorinated organic material may be 30% or so in terms of atom %. By controlling the fluorination degree to this numerical value range, the sacrificial layer can be formed with dissolution resistance to a solvent such as, for example, cyclopentanone or 1-methoxy-2-propyl acetate used in the above-described film formation step $S_1$.

When the sacrificial layer is formed with a metal oxide, the metal oxide may desirably be MgO, $CrO_3$, $Y_2O_3$, $ZrO_2$ or the like, for example, when a strongly alkaline developer is used in the patterning step (2) to be described hereinafter, because $Nb_2O_5$, $Ta_2O_5$, $WO_3$, $TiO_2$, $Al_2O_3$ and the like are easily soluble in alkalis. As developers for positive resists, strongly alkaline developers are generally used. For negative resists, however, organic solvents can be used as developers. Therefore, the use of a negative resist such as SU-8 described above is also desired from the viewpoint of avoiding improper etching of the sacrificial layer by a strongly alkaline developer.

Even if the sacrificial layer is formed with MgO, $CrO_3$, $Y_2O_3$, $ZrO_2$ or the like to avoid such improper etching of the sacrificial layer by a strongly alkaline developer, improper dissolution or etching of the sacrificial layer occurs all the same when a reaction is conducted under acidic conditions for the immobilization of a substance in the immobilization step (5) to be described subsequently herein. When the sacrificial layer is formed with $Nb_2O_5$, $Ta_2O_5$, $WO_3$, $TiO_2$, $Al_2O_3$ and the like, on the other hand, there is a potential problem in that the sacrificial layer may be dissolved or etched through a reaction under alkaline conditions.

Taking into consideration the conditions for the chemical solutions employed in the various steps for the preparation of the beads and the immobilization step of the nucleic acids or the like before the stripping step, the preferred material for the sacrificial layer can, therefore, be the above-mentioned fluorinated organic material.

(2) Patterning Step

In FIG. 2, a "patterning step" designated at sign $S_2$ is a step that patterns the thin film, which has been formed in the film formation step $S_1$, into predetermined shapes by photolithography. This step is conducted by one of different procedures, depending on whether (2-1) a resist like SU-8 was formed, as the material for the microbeads, into the thin film or (2-2) silicon dioxide or a suitable metal was formed, as the material for the microbeads, into the thin film.

(2-1) When a Resist Like SU-8 was Formed, as the Material for the Microbeads, into the Thin Film.

Firstly, the thin film formed in the film formation step $S_1$ is heated and solidified (prebaked) as needed. Next, exposure is conducted using a photomask in which the shapes of the microbeads are drawn (which may hereinafter be simply called "the mask"). The exposed substrate is immersed in a developer to remove the thin film at unnecessary regions. Further, the developed substrate is rinsed with a rinsing fluid (isopropyl alcohol: IPA) to completely remove the unnecessary regions. As a result of subsequent postbaking, the shapes of the microbeads appear in the thin film remaining on the substrate.

By designing the exposure apertures or the like in the mask in accordance with the shapes of the microbeads to be prepared, the microbeads can be formed with the desired shapes on the substrate. Further, by similarly designing a mask as desired, it is possible to form sets of microbeads of various shapes as many as desired, respectively. On the other hand, use of a maskless exposure system makes it possible to similarly form sets of microbeads of desired shapes as many as desired, respectively.

(2-2) When Silicon Dioxide or a Suitable Metal was Formed, as the Material for the Microbeads, into the Thin Film.

Firstly, a commonly-employed resist is spin-coated on the surface of the thin film, and optionally, prebaking is conducted as needed. Using a similar mask as that described above, exposure is next conducted. The exposed substrate is immersed in a developer to remove the resist at unnecessary regions. Further, the developed substrate is rinsed several times with a rinsing fluid (primarily, ultrapure water) to completely remove the unnecessary regions, and postbaking is then conducted. After the thin film is then patterned by etching, the unnecessary resist is completely removed. As a result, the shapes of the microbeads appear in the thin film remaining on the substrate.

(3) Functional Group Modification Step

In FIG. 2, a "functional group modification step" designated at sign $S_3$ is a step that modifies the surface of the thin film, which has been patterned in the patterning step $S_2$, with functional groups.

In the patterning step $S_2$, the thin film formed on the substrate in the film forming step $S_1$ was allowed to remain at only regions which will become the microbeads (hereinafter called "the microbead regions") and was removed at the regions other than the microbead regions. In the functional group modification step $S_3$, a functional group modification for an immobilization step, which will be described next, is applied to the surface of the thin film at the microbead regions.

The modifying functional groups can be, for examples, hydroxyl groups, amino groups, carboxyl groups, isothiocyanate groups, epoxy groups, maleinimido groups, or the like. The modification of the surface of a substrate with functional groups has been traditionally conducted in the fabrication of DNA chips or protein chips to introduce a linker for immobilizing nucleic acid chains or peptides on the surface of the substrate. A similar method can also be adopted in this embodiment.

As a specific example, a description will be made about the modification of the surface of the thin film with hydroxyl groups. In this case, the surface of the thin film is firstly treated with aminopropyltriethoxysilane, and the substrate is then immersed in a solution of γ-valerolactone in dimethylformamide (DMF) to conduct a reaction such that modification can be effected with hydroxyl groups. As an alternative, the modification can also be conducted by treating the surface of the thin film with glycidoxypropyltrimethoxysilane, immersing the substrate in a mixed solution of tetraethylene glycol and a small amount of concentrated sulfuric acid added therein, and conducting a reaction.

This functional group modification step $S_3$ and a water-repellent treatment step $S_4$, which will be described next, can also be conducted in the reverse order. It is to be noted that both of these steps are not essential steps.

(4) Water-Repellent Treatment Step

In FIG. 2, the "water-repellent treatment step" designated at sign $S_4$ is a step that conduct a water-repellent treatment to substrate regions between the respective bead regions of the thin film patterned in the patterning step $S_2$.

The thin film formed on the substrate in the film formation step $S_1$ was allowed to remain at only the microbead regions, and was removed at the regions other than the microbead regions. In the water-repellent treatment step $S_4$, water repellency for the immobilization step to be described next is imparted to the substrate regions at which the thin film has been removed (in other words, the substrate regions between the respective microbead regions of the patterned thin film).

By providing the substrate regions, at which the thin film has been removed, with water repellency, it is possible to prevent solutions, which are dropped to the microbead regions of the thin film, from mixing with each other.

The water-repellent treatment can be conducted, for example, as will be described hereinafter. Firstly, the microbead regions of the thin film is once covered with a traditionally-employed resist, and the substrate regions at which the thin film has been removed are treated with triethoxy-1H,1H,2H,2H-tridecafluoro-n-octylsilane. By subsequently removing the resist, water repellency can be imparted to the substrate regions other than the microbead regions. As an alternative, water repellency can also be imparted by covering the microbead regions of the thin film with a resist, spin-coating a fluorinated resin, and then baking the thus-coated fluorinated resin.

If the functional group modification step $S_3$ is conducted after conducting the water-repellent treatment step $S_4$ beforehand, the substrate regions at which the thin film has been removed are subjected to a water-repellent treatment, and only the microbead regions are then modified with functional groups.

(5) Immobilization Step

In FIG. 2, the "immobilization step" designated at sign $S_5$ is a step that conducts immobilization of nucleic acids or peptides on the surfaces of the microbead regions of the thin film patterned in the patterning step $S_2$. It is to be noted that the substances to be immobilized include sugar chains and various compounds in addition to nucleic acids and peptides as mentioned above.

At this stage, only the microbead regions of the thin film are remaining on the substrate, and water repellency has been imparted to the substrate regions other than the microbead regions. In the immobilization step $S_5$, a nucleoside solution or amino acid solution (hereinafter collectively called "the monomer solution") is dropped onto the surfaces of desired ones of the microbead regions of the thin film, and the immobilization of a nucleic acid or peptide is conducted by a stepwise synthesis on the surfaces of the desired microbead regions. On the surfaces of the remaining microbead regions, another nucleic acid or peptide is immobilized likewise. For the sake of brevity, however, a description is omitted herein about the immobilization of the another nucleic acid or peptide on the remaining microbead regions.

The stepwise synthesis of the nucleic acid or peptide can be conducted by repeating a synthesis cycle such that in accordance with the desired base sequence or amino acid sequence, monomer solutions with the corresponding bases or amino acids contained therein are sequentially dropped onto the surfaces of the microbeads regions of the thin film to subject them to bonding reactions.

When immobilizing the nucleic acid, for example, a monomer solution containing a nucleoside is firstly dropped from a pipette, and subsequently, a 5-ethylthiotetrazole solution is dropped and reacted. Subsequent to rinsing and drying, an oxidizing solution is dropped and reacted to convert nucleoside phosphite triester into nucleoside phosphate triester. After rinsing, a mixed solution of acetic anhydride and tetrahydrofuran is dropped and reacted to cap unreacted hydroxyl groups introduced in the functional group modification step $S_3$. Subsequent to rinsing and drying, a dichloromethane solution with dichloroacetic acid contained therein is dropped to eliminate dimethoxytrityl protecting groups from the 5'-hydroxyl groups of nucleoside moieties bound to the substrate. Subsequently, rinsing and drying are conducted. The above-described respective steps, i.e., (a) the nucleoside binding, (b) the rinsing, (c) the oxidation, (d) the rinsing, (e) the elimination of dimethoxytrityl protecting groups and (f) the rinsing are repeated. Finally, deprotection of base moieties of the nucleic acid is conducted. By the above procedure, the nucleic acid of the desired base sequence can be immobilized.

When immobilizing the peptide, on the other hand, steps are repeated such that monomer solutions containing amino acids—which are appropriately protected, for example, at their α-amino groups and side-chain functional groups—are sequentially dropped to condense the amino acids on the surfaces of the microbead regions of the thin film by a suitable condensation method. Finally, the respective protecting groups are eliminated. By the above procedure, the peptide of the desired amino acid sequence can be immobilized.

The immobilization of the nucleic acid or peptide can also be conducted by dropping a solution, which contains the nucleic acid or peptide synthesized beforehand, onto the surfaces of the microbead regions of the thin film and binding it to the functional groups introduced in the functional group modification step $S_3$.

The dropping of the monomer solutions or the solution of the nucleic acid or peptide synthesized before hand can be conducted by spotting from a pipette or microdispenser or by inkjet spotting.

(6) Stripping Step

In FIG. 2, the "stripping step" designated at sign $S_6$ is a step that strips off from the substrate the patterned thin film carrying the nucleic acid or peptide immobilized thereon.

The stripping of the thin film can be conducted, for example, by immersing the substrate in an alkaline or acidic stripper. Optionally, the stripping may be promoted by applying ultrasonication concurrently with the immersion.

The stripping of the thin film in this step can be further facilitated if a sacrificial layer, which can be physically or chemically etched, is stacked prior to the formation of the thin film in the film formation step $S_1$. When a nucleic acid is immobilized by a step synthesis, for example, the deprotection of base moieties of the nucleic acid is finally conducted in an aqueous alkaline solution. Use of a silane coupling agent as the sacrificial layer makes it possible to also etch the sacrificial layer and hence to strip the resultant microbeads while conducting the protection of the nucleic acid. On the other hand, use of magnesium oxide as the sacrificial layer can strip the microbeads by etching it with an acidic aqueous solution such as an aqueous solution of dilute hydrochloric acid or an aqueous solution of ammonium chloride.

Preferred as the stripper is one capable of etching the sacrificial layer to strip off the microbeads from the substrate without changing the shape of the microbeads patterned before the stripping step or modifying or liberating the nucleic acid or the like immobilized before the stripping step. It is, therefore, suitable to form the sacrificial layer by a fluorinated organic material layer and to etch the fluorinated organic material layer with a fluorinated solvent or to cause sublimation of the fluorinated organic material layer.

As already described above, a fluorinated solvent has properties that it can be hardly mixed with high molecular materials having charges and it can hardly dissolve high molecular materials other than fluorinated high molecular materials. When the sacrificial layer is etched with a fluorinated solvent, the nucleic acid or the like remains free from modifications, liberation and/or the like.

Moreover, the use of a low molecular material, specifically a fluorine derivative or the like of triazine as the fluorinated organic material layer can strip the microbeads by causing the fluorinated organic material layer to sublimate, and therefore, can more surely retain the ability to interact with the target nucleic acid, the target protein, or the like. Sublimation conditions for the fluorinated organic material layer can be adequately set in accordance with the molecular weight and the like of the material used. The sublimation temperature may be set at 100° C., or may be set at lower than 100° C. provided that the sublimation is conducted under vacuum conditions.

3. Specific Example of the Microbead Preparation Process

Referring next to FIGS. 3A through 3F and FIGS. 4A and 4B, a more specific description will be made about the above-mentioned preparation process of the microbeads and microbead set. Taking as an example a case in which the microbeads and microbead set depicted in FIG. 1 are prepared using SU-8 as a material for the microbeads, the description will be made hereinafter.

Figure 3A:
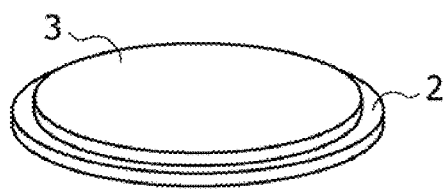
FIGS. 3A through 3F are perspective views schematically depicting constructions on a substrate in a film formation step $S_1$ and patterning step $S_2$.
Figure 3B:
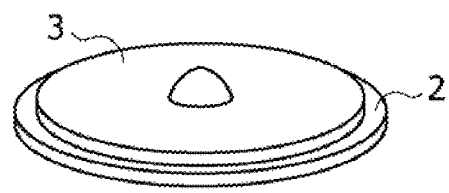
Figure 3C:
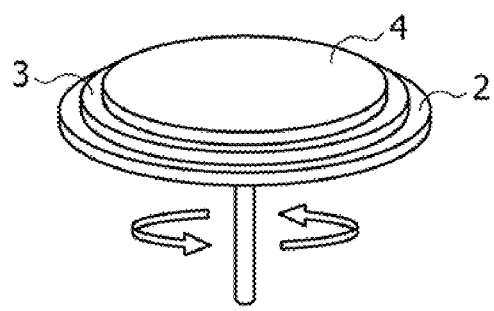

As shown in FIG. 3A, a sacrificial layer 3 is firstly stacked on a substrate 2. SU-8 is next placed over the sacrificial layer 3 (see FIG. 3B). Spin coating is conducted to form a thin film 4 on the sacrificial layer 3 as illustrated in FIG. 3C.

At this time, the amount of SU-8 and the revolution speed (see the arrows in the figure) of a spin coater are controlled to adjust the thickness of the thin film such that the resulting microbeads can be set at a desired thickness (see sign h in FIG. 1).

Figure 3D:
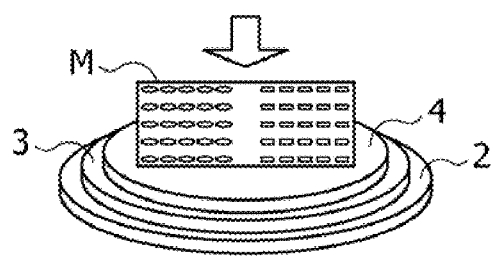
Figure 3E:
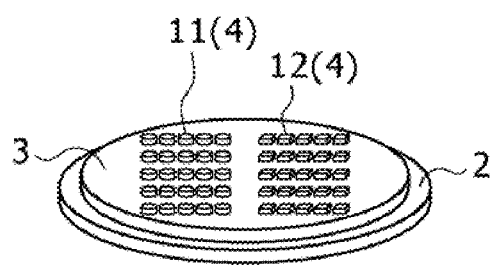

After the thin film 4 formed in the film formation step $S_1$ is prebaked, exposure is conducted using a mask M with the shapes of the microbeads drawn therein as depicted in FIG. 3D. In the figure, the arrow indicates light from a light source.

The exposed substrate 2 is immersed in a developer to remove the thin film 4 at unnecessary regions. By further conducting rinsing or the like with a rinsing solution, the shapes of microbeads 11 and 12 appear at the thin film 4 still remaining on the substrate 2 (see FIG. 3E).

Figure 3F:
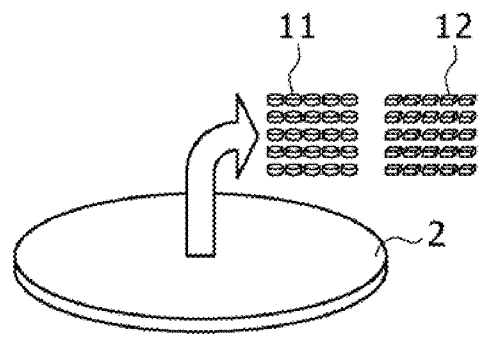

As already described above, the surface of the thin film 4 is subjected at regions, which will become the microbeads 11 and 12 and will hereinafter be called "the microbead regions," to a modification with functional groups, the substrate 2 is subjected at regions thereof, where the thin film 4 has been removed (in other words, its regions between the respective microbead regions), to a water-repellent treatment, and the immobilization of nucleic acids, peptides, or the like is then conducted. Subsequently, the sacrificial layer 3 is caused to disintegrate by a treatment with a fluorinated solvent, acid or alkali. As illustrated in FIG. 3F, the thin film 4 is hence stripped off from the substrate 2 to obtain the microbeads 11 and 12, that is, the bead set 1 includes these microbeads 11 and 12.

Here, sets of microbeads of desired shapes can be formed on the substrate 2 by designing the exposure apertures or the like in the mask M in accordance with the shapes of the respective microbeads to be prepared. By similarly designing the aperture openings or the like in the mask M as desired, sets of microbeads of various shapes can be formed in desired numbers, respectively. According to the microbead preparation process of this application, sets of microbeads which can be identified depending on their differences in shape can be efficiently prepared at low cost. By suitably designing the exposure apertures or the like of the mask, it is also possible to prepare a bead set includes a multiplicity of sets of microbeads the populations of which are exactly set.

The thus-obtained microbeads are characterized in that owing to their preparation steps, each microbead has a three-dimensional shape provided with two faces opposing each other and extending substantially in parallel with each other, and the corresponding nucleic acid or the like is immobilized on only one of the two faces. The two faces which oppose each other and extend substantially in parallel with each other have been formed owing to the formation step of the thin film, and therefore, the distance between the two faces, in other words, the thickness of the microbead (see sign h in FIG. 1) can be set as desired by adjusting the thickness of the film. As the immobilization of the nucleic acids or the like is conducted before the stripping of the microbeads, each nucleic acid or the like is immobilized on only one of the opposing faces of each of the corresponding microbeads.

Figure 4A:
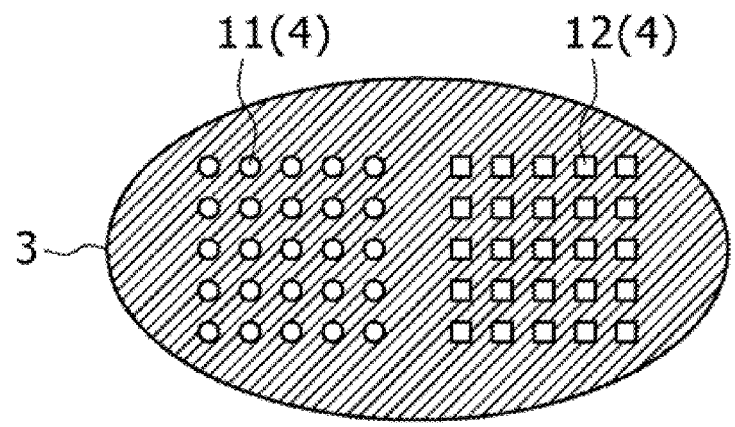
FIGS. 4A and 4B are top plan views schematically depicting constructions on the substrate in a water-repellent treatment step $S_4$.

FIG. 4A illustrates the case in which the microbeads 11 and 12 have been formed on the substrate 2 as described above with reference to FIGS. 3A through 3F. By the patterning step $S_2$, the thin film remains at only the microbead regions on the substrate and has been removed at the regions other than the microbead regions. In the water-repellent treatment step $S_3$, water repellency is imparted to the substrate at regions where the thin film has been removed (and the sacrificial layer 3 is exposed). These substrate regions are indicated by hatching in FIG. 4A. The water-repellent treatment can be conducted by subjecting the hatched substrate regions to a treatment, for example, with triethoxy-1H,1H,2H,2Htridecafluoro-n-octyl silane.

In the immobilization step $S_5$, solutions of monomers or solutions of nucleic acids or peptides synthesized beforehand are dropped onto the surface of the thin film at their corresponding regions, which will become the microbeads 11 and 12, respectively. Owing to the above-described water-repellent treatment, these solutions can be prevented from mixing each other. Upon dropping each of the solutions of the monomers or the solutions of the nucleic acids or peptides synthesized beforehand onto the surface of the thin film at its corresponding microbead regions in the immobilization step $S_5$, the solution can, therefore, be spotted exactly onto the aimed microbead regions so that the nucleic acid or peptide having the desired base sequence or amino acid sequence can be immobilized there. Further, sugar chains or compounds do not mix with each other either upon immobilizing them.

In FIG. 4A, the water-repellent treatment is applied surrounding the respective microbead regions of the thin film. When a plurality of microbead regions of the same kind have been patterned on a substrate, however, a water-repellent treatment can be applied surrounding an area where the microbead regions of the same kind have been patterned. When two sets of microbeads 11 and 12 have been patterned in predetermined numbers, respectively, for example, a water-repellent treatment can be applied, for example, to the hatched areas shown in FIG. 4B. By such a water-repellent treatment, each monomer solution or the like can be dropped onto the same set of microbead regions (the same group of microbead regions) all together, and moreover, can be prevented from mixing with a solution dropped onto an adjacent, another set(group) of microbeads regions.

The dropping of each monomer solution or the like is conducted by spotting from a pipette or microdispenser or by inkjet spotting. According to such a spotting method, microdroplets, which are delicately different from each other in solution physical properties and are relatively high in viscosity, are ejected into air and are caused to adhere to a substrate. Upon ejecting such microdroplets, splashed droplets (i.e., so-called "satellites") may occur, and the monomer solution or the like may hence adhere to regions other than those intended.

According to the microbead preparation process of the embodiment, the microbeads are finally stripped off from the substrate. No problem, therefore, arises even if the monomer solution or the like adheres as satellites to the substrate regions other than the microbead regions.

Figure 4B:
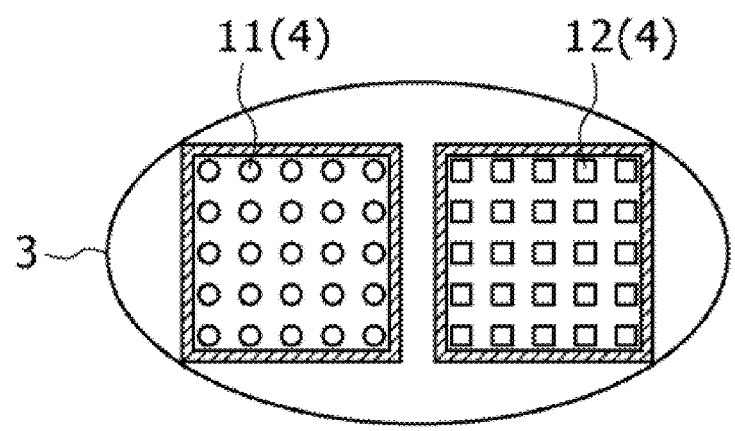
Figure 5A:
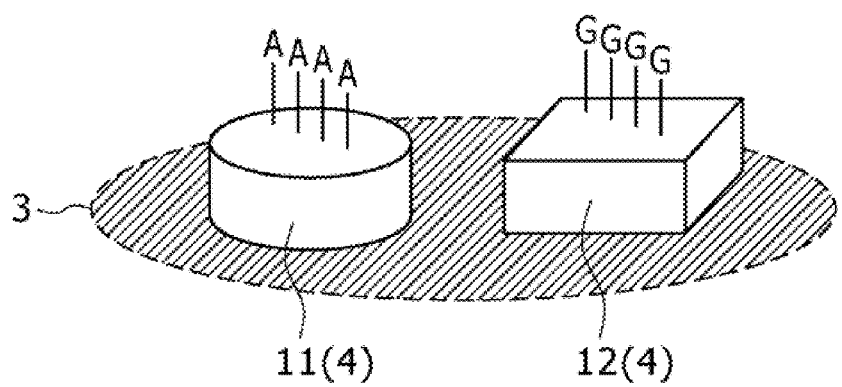
FIGS. 5A and 5B are perspective views schematically showing constructions on the substrate in an immobilization step $S_5$.
Figure 5B:
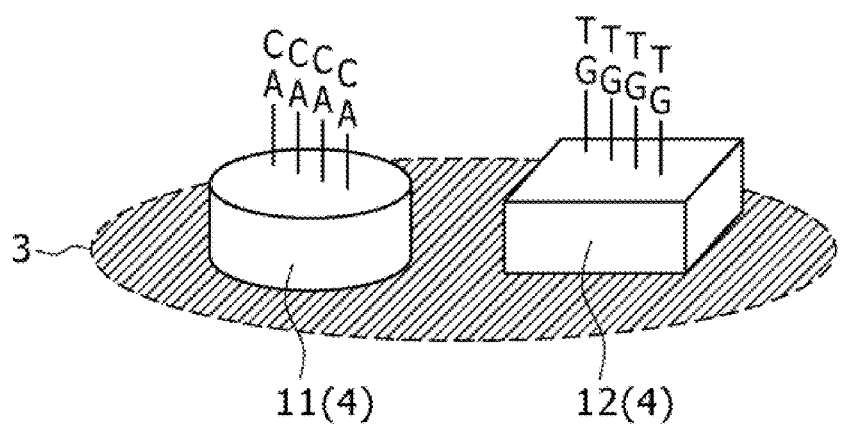

Referring next to FIGS. 5A and 5B, the immobilization step $S_5$ will be described. Taking as an example the case that as illustrated in FIGS. 3A through 3F and FIG. 4A, the microbeads 11 and 12 are patterned on the substrate 2, the water-repellent treatment is conducted, and the nucleic acids are then immobilized by stepwise syntheses on the surfaces of the microbeads 11 and 12, respectively, the description will be made. FIGS. 4A and 4B show on an enlarge scale the microbeads 11 and 12 patterned on the sacrificial layer 3.

Onto the surface of the thin film 4 at the region which will become the microbead 11, a monomer solution with adenine "A" contained therein is dropped. On the surface of the thin film 4, a linker has been introduced in the functional group modification step $S_3$. Onto the surface of the thin film 4 at the region which will become the microbead 12, on the other hand, a monomer solution with guanine "G" contained therein is dropped likewise. Subsequently, the linker and the adenine and guanine in the dropped monomer solutions are subjected to binding reactions (see FIG. 5A).

Next, a monomer solution with cytosine "C" contained therein is dropped onto the region which will become the microbead 11, while a monomer solution with thymine "T" contained therein is dropped onto the region which will become the microbead 12. Second-stage binding reactions are then conducted (see FIG. 5B). These synthesis steps are then repeated in accordance with the desired base sequences, respectively.

As the water-repellent treatment was applied in the water-repellent treatment step $S_4$ to the area indicated by the hatching in FIG. 4A or the areas indicated by the hatching in FIG. 4B, each monomer solution dropped onto the region which will become the microbead 11 and the corresponding monomer solution dropped onto the region which will become the microbead 12 do not mix with each other. It is, therefore, possible to precisely synthesize and immobilize the nucleic acid chains of the desired base sequences on the surfaces of the microbeads 11 and 12, respectively.

In immobilization by photochemical reactions such as that conducted in the related art fabrication of DNA chips, it is necessary to conduct four binding reactions for the synthesis in each stage by using four photomasks with respect to the respective bases (A,G,T,C). In the present application, on the other hand, the monomer solutions with the respective bases contained therein can be dropped onto the microbeads regions divided by the area or areas subjected to the water-repellent treatment, and the respective bases can be simultaneously subjected to binding reactions with the corresponding bases immobilized precedingly on the microbead regions. The syntheses and immobilization of the nucleic acid chains can be conducted at low cost.

According to the microbead preparation process of the embodiment, the microbeads are stripped off by causing the sacrificial layer 3 to disintegrate in the stripping step $S_5$ after the completion of the step syntheses. No nucleic acid or the like is, therefore, immobilized on the face of each microbead, at which the microbead was in contact with the sacrificial layer 3. Accordingly, each microbead so obtained carries its corresponding nucleic acid or the like immobilized on only one of the opposing faces of the microbead.

In general, the face of each microbead, said face carrying its corresponding nucleic acid chain or the like immobilized thereon, is converted into a hydrophilic surface to permit an interaction with the nucleic acid chain or the like with a target nucleic acid or target protein. At this time, the face of each microbead, at which the microbead was in contact with the sacrificial layer 3, can be converted into a hydrophobic surface. Owing to the repulsion between the hydrophilic surfaces and the hydrophobic surfaces, the microbeads can hence be prevented from lying overlapped when an observation or optical detection is conducted, for example, by placing and spreading the microbeads on a sample holder such as slide glass. By converting the surface of a sample holder into a hydrophobic surface, for example, the microbeads can also be placed on a sample holder with the faces of the microbeads, said faces carrying their corresponding nucleic acid chains or the like immobilized thereon, being directed upwards owing to the affinity between the hydrophobic surface of the sample holder and the hydrophobic surfaces of the microbeads.

EXAMPLE 1

<Preparation of SU-8-Made Microbeads>

In this Example, SU-8 which had been formed on a silicon substrate was patterned by photolithography. Subsequent to stepwise syntheses of nucleic acids, stripping was conducted to prepare microbeads.

(1) Film Formation Step

After the silicon substrate was subjected at a surface thereof to a treatment with an aminosilane ("KBM-603," trade name, product of Shin-Etsu Silicone Co., Ltd.) at 120° C. for 10 hours, SU-8 was spin-coated, followed by prebaking at 100° C. for 3 minutes. As the SU-8, "SU-8-3035-N-02" (trade name, product of Kayaku Microchem Co., Ltd.) was used in a form diluted twofold, and was coated to give a final thickness of 3 µm.

(2) Patterning Step

Exposure was conducted using a mask, in which two sets of different shapes, one set includes plural circles and the other set includes plural starbursts, were drawn such that those sets were divided into two areas (hereinafter called "mask areas"). Subsequent to postbaking at 100° C. for 2 minutes, development was conducted. The developed film was rinsed with IPA, dried, and then subjected to hard baking at 150° C. for 10 minutes.

Figure 6A:
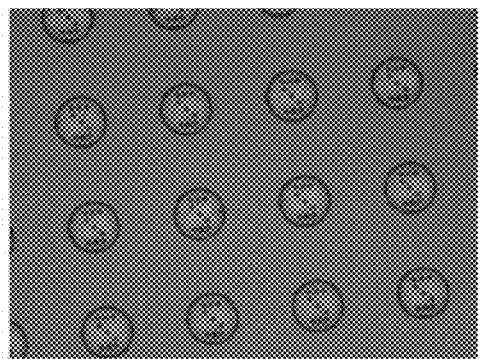
FIGS. 6A through 6D are fragmentary photos showing a thin SU-8 film subjected to patterning in the patterning step of Example 1.
Figure 6B:
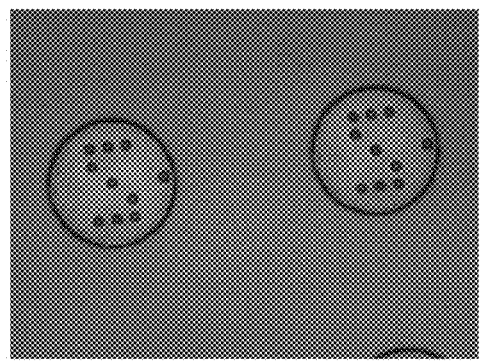
Figure 6C:
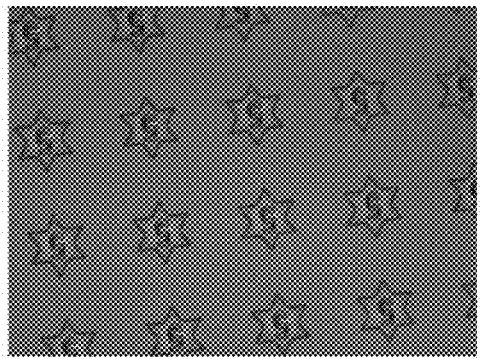
Figure 6D:
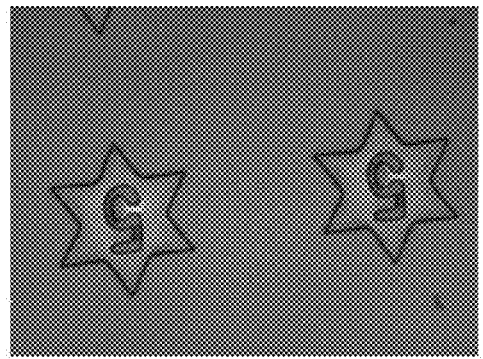

The shapes of the thin SU-8 film, said shapes having been patterned in two microbead areas, respectively, on the substrate, are shown in FIGS. 6A through 6D. FIGS. 6A and 6B are fragmentary top plan views of a microbead area patterned through the mask area containing the circles, while FIGS. 6C and 6D are fragmentary top plan views of a microbead area patterned through a mask area containing the starburst. FIGS. 6B and 6D are enlarged views of FIGS. 6A and 6C, respectively. From the microbead area (hereinafter called "the microbead area A") in FIGS. 6A and 6B, flattened cylindrical microbeads a of circular cross-section are prepared with a dot pattern formed on their circular top surfaces. From the microbead area (hereinafter called "the microbead area B") in FIGS. 6C and 6D, on the other hand, flattened cylindrical microbeads b of starburst-shaped cross-section are prepared with numeral 5 formed on their starburst-shaped top surfaces.

(3) Modification with Hydroxyl Groups

After the substrate was subjected at the surface thereof to a treatment with glycidoxypropyltrimethoxysilane at 120° C. for 10 hours, the substrate was immersed in a mixed solution of tetraethylene glycol (800 mL) and concentrated sulfuric acid (3 mL). A reaction was then conducted under stirring at 80° C. for 8 hours to conduct a modification with hydroxyl groups.

(4) Water-Repellent Treatment

Next, the microbead areas A, B were once covered with a resist, and the remaining substrate area was subjected to a treatment with triethoxy-1H,1H,2H,2H-tridecafluoro-n-octylsilane at 120° C. for 10 hours. By removing the resist, water repellency was imparted to the substrate area other than the microbead areas A, B.

(5) Stepwise Syntheses of Nucleic Acids

At the microbead areas A, B, the stepwise syntheses of nucleic acids were conducted in accordance with the base sequences shown in Table 1, respectively.

TABLE 1

| | |
|---|---|
| Bead area A 5'-GAGAACGATCTTCAGGGTGC-3' | SEQ ID NO: 1 |
| Bead area B 5'-CGATCTAGGTACTGCAAGTA-3' | SEQ ID NO: 2 |

Individual nucleoside phosphoramidites were separately formulated at 0.1 M in propylene carbonate. Further, 5-ethylthiotetrazole was formulated at 0.5 M in propylene carbonate.

Onto the microbead areas A, B, the corresponding nucleoside phosphoramidites were dropped from pipettes, followed by the dropping of a 5-ethylthiotetrazole solution in the same amounts from pipettes. After reacted for 60 seconds under a nitrogen atmosphere, the microbead areas A, B were rinsed with acetonitrile to remove any extra reagents, and the microbead areas A, B were then dried. An oxidizing solution (a 0.02 M iodine solution prepared using a mixed solution of pyridine, tetrahydrofuran and water) was dropped, and was then reacted for 30 seconds to convert the resultant nucleoside phosphate triesters into their corresponding nucleoside phosphite triesters. The microbead areas A, B were rinsed with acetonitrile. Subsequently, a mixed solution of acetic anhydride and tetrahydrofuran was dropped, and was then reacted for 30 seconds to cap unreacted hydroxyl groups modified to the microbead areas A, B. After the microbead areas A, B were rinsed with acetonitrile and were dried, a 2.5% solution of dichloroacetic acid in dichloromethane was dropped, and was then reacted for 60 seconds to eliminate the dimethoxytrityl protecting groups from the 5'-hydroxyl groups of the nucleosides.

After the microbead areas A, B were rinsed with acetonitrile and were dried, the above-described steps, that is, (a) the nucleoside binding, (b) the rinsing with acetonitrile, (c) the oxidation, (d) the rinsing with acetonitrile, (e) the elimination of dimethoxytrityl protecting groups and (f) the rinsing with acetonitrile were repeated 19 times. Finally, the substrate was immersed at room temperature for 1 hour or so in a solution of ammonia (13%) and methylamine (20%) in water to conduct the deprotection of the nucleic acid base moieties.

(6) Stripping Step

To the substrate in the solution of ammonia (13%) and methylamine (20%) in water, ultrasonication was further applied for 30 minutes or so to strip the thin SU-8 film from the substrate, thereby obtain a microbead set includes the two sets of the microbeads of the different shapes, specifically the microbeads a (in the form of the flattened cylindrical shape of circular cross-section) and the microbeads b (in the form of the of the flattened cylindrical shape of starburst-shaped cross-section). The recovered bead set was rinsed with pure water, and was then dried.

EXAMPLE 2

<Isolation of Target Nucleic Chains by the Use of SU-8-Made Microbeads>

In this Example, isolation and detection of target nucleic acid chains were conducted using the bead set obtained in Example 1.

Synthesized as the target nucleic acid chains was a nucleic acid having a base sequence complementary to the nucleic acid immobilized at the microbead area A. The target nucleic acid chains had the base sequence shown in Table 2, in which the underlined part indicates a base sequence complementary to the nucleic acid immobilized at the microbead area A. The target nucleic acid was modified at the 5' end thereof with a fluorochrome (Cy3).

TABLE 2

| Target nucleic acid | CTACCTGCACCCTGAAGATCGTTCTC SEQ ID NO: 3 |
|---|---|

The microbead set was added to a solution of target nucleic acid chains, and in an Eppendorf tube, a hybridization reaction was conducted at room temperature for 1 hour. After the microbeads were recovered from the solution, they were rinsed with a buffer, spread side by side over a slide plate, and then observed under a fluorescence microscope. As a result, fluorescence of Cy3 was observed on only the microbeads a (in the form of the flattened cylindrical shape of circular cross-section) on which the nucleic acid chains having the base sequence complementary to the target nucleic acid were immobilized.

EXAMPLE 3

<Preparation of Silicon-Dioxide-Made Microbeads and Isolation of Target Nucleic Acid Chains>

In this Example, a silicon dioxide film formed on a substrate was patterned by photolithography. After immobilization of nucleic acids synthesized beforehand, stripping was conducted to prepare microbeads.

(1) Film Formation Step

Using a vapor deposition system manufactured by Ulvac Inc., magnesium oxide was deposited at a deposition rate of 1 Angstrom/s to 200 nm on a glass substrate, and subsequently, tetraethoxysilane (TEOS) was applied by CVD processing such that a silicon dioxide film was formed with a thickness of 3μm.

(2) Patterning Step

A positive resist ("AZ1500," trade name, product of AZ Electronic Materials (Japan) K.K.) was spin-coated on the surface of the thin silicon dioxide film, followed by prebaking at 90° C. for 90 seconds. Using a mask similar to that employed in Example 1 except that the mask was formed as a positive mask and two sets of circles, the circles in one of the two sets being equipped with one of two different dot patterns and the circles in the other set the other dot pattern, are drawn at the two mask areas, respectively (see FIGS. 6A and 6B), exposure was conducted. Subsequent to development, the substrate was rinsed with pure water and then dried.

Figure 7A:
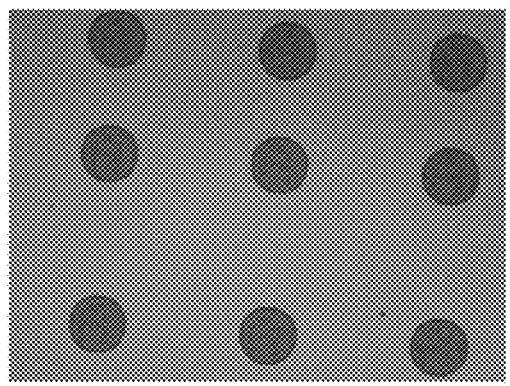
FIGS. 7A and 7B are fragmentary photos illustrating a thin resist film subjected to patterning in the patterning step of Example 3.
Figure 7B:
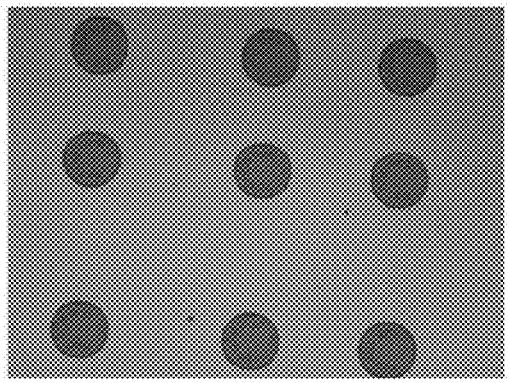

The shapes of the thin resist film patterned at two areas on the substrate are shown in FIGS. 7A and 7B. At the areas shown in FIGS. 7A and 7B, two sets of circular microbead regions, the microbead regions in one of the two sets being equipped with the one dot pattern and the microbead regions in the other set the other dot pattern, were patterned in the thin resist film, respectively.

Subsequent to postbaking at 130° C. for 5 minutes, the thin silicon dioxide film was patterned by dry etching. The resist was then removed to obtain the thin silicon dioxide film in a form that the two sets of circular microbead regions, the microbead regions in one of the two sets being equipped with the one dot pattern and the microbead regions in the other set the other dot pattern, were formed at the two microbead areas A, B, respectively, on the substrate.

(3) Modification with Epoxy Groups

The substrate was treated at the surface thereof with glycidoxypropyltrimethoxysilane at 120° C. for 10 hours to conduct a modification with epoxy groups.

(4) Water-Repellent Treatment

Next, the microbead areas A, B were once covered with a resist, and the remaining substrate area was subjected to a treatment with triethoxy-1H,1H,2H,2H-tridecafluoro-n-octylsilane at 120° C. for 10 hours. By removing the resist, water repellency was imparted to the substrate area other than the microbead areas A, B.

(5) Immobilization of Nucleic Acids, and Stripping Step

Nucleic acids, which had the base sequences shown in Table 1 of Example 1, were immobilized on the surfaces of the microbead areas A, B, respectively, on the substrate. As the nucleic acids for use in this Example, nucleic acids of the base sequences shown in Table 1 were synthesized beforehand with their 5' ends having been modified with an amino modifier ("5'-AMINO-MODIFIER C12," trade name, product of Glen Research Corp.), and were reacted with the epoxy groups at room temperature for 6 hours under alkaline conditions.

After the substrate was rinsed with pure water, the substrate was immersed at room temperature for 1 hour in a 1 M aqueous solution of ammonium chloride to strip the thin silicon dioxide film from the substrate, thereby obtaining a bead set includes flattened, circular cylindrical microbeads a, b which were originated from the microbeads areas A, B, respectively, and were different in dot pattern. The recovered microbead set was rinsed with pure water, and was then dried.

(6) Isolation of Target Nucleic Acid Chains

Using the thus-obtained microbead set, isolation and detection of the target nucleic acid chains synthesized in Example 2 were conducted.

The microbead set was added to a solution of the target nucleic acid chains, and in an Eppendorf tube, a hybridization reaction was conducted at room temperature for 1 hour. After the microbeads were recovered from the solution, they were rinsed with a buffer, spread side by side over a slide plate, and then observed under the fluorescence microscope. As a result, fluorescence of Cy3 was observed on only the microbeads a with the microbeads subjected to the silane coupling treatment was immersed for 12 hours. The substrate was taken out, was rinsed for 15 minutes under stirring in 2×SSC buffer which contained 0.2 M of SDS, and was then rinsed for 5 minutes under stirring in a fresh supply of 2×SSC buffer with 0.2 M of SDS contained therein while being heated at 90° C. The substrate was rinsed for 3 minutes in running water, and was then dried.

TABLE 3

| Oligo DNA-1 | 5'-GACAATGTGTACATCAACATCACCTACCAC-3' | SEQ ID NO: 4 |
| Oligo DNA-2 | 5'-GACAATGTGTACATCAACATCACCTACCAC-3' | SEQ ID NO: 5 |
| Oligo DNA-3 | 5'-GTGGTAGGTGATGTTGATGTACACATTGTC-3' | SEQ ID NO: 6 | on which the nucleic acid chains having the base sequence complementary to the target nucleic acid were immobilized.

EXAMPLE 4

<Discussion on Sacrificial Layer>
Sacrificial layer of high molecular material "CYTOP™" as fluorinated organic material
(1) Formation of Sacrificial Layer
After "CYTOP™" ("CTX-809AP2," trade name, product of Asahi Glass Co., Ltd.; employed by diluting the stock solution to 80% with perfluorobutylamine) was spin-coated firstly at 700 rpm for 3 seconds and then at 4,000 rpm for 20 seconds onto a UV-ozone-cleaned silicon substrate, the substrate was dried at 50° C. for 30 minutes, then at 80° C. for 60 minutes, and finally at 200° C. for 30 minutes. As a result of a measurement of the thickness of the "CYTOP™" film by a contact thickness meter, its thickness was determined to be approx. 400 nm.

To provide the sacrificial layer with improved adhesion properties to SU-8, the sacrificial layer was subjected first to an $O_2$-RIE treatment (gas species: $O_2$, power: 70 W, pressure: 18 Pa, flow rate: 10 sccm, time: 15 sec) and then to an $O_2$-plasma treatment (direct plasma, gas species: $O_2$, power: 100 W, pressure: 3 Pa, flow rate: 30 sccm, time: 15 sec).
(2) Patterning Step
After an $O_2$-RE treatment, SU-8 ("SU-8-3035-N-02" (trade name), product of Kayaku Microchem Co., Ltd., employed after 2-fold dilution with cyclopentanone) spin-coated firstly at 500 rpm for 15 seconds and then at 1,500 rpm for 30 seconds, the resulting thin SU-8 film was dried at 100° C. for 2 minutes. Using a chrome mask having a microbead pattern drawn thereon, i-ray exposure (170 mJ/cm$^2$) was conducted on a contact aligner, followed by drying at 100° C. for 3 minutes. The thus-exposed thin SU-8 film was developed with an SU-8 developer (product of Kayaku Microchem Co., Ltd.), rinsed with IPA, and then subjected to hard baking at 150° C. for 10 minutes. As a result, an aligned microbead pattern was obtained on the substrate. As a result of a measurement of the thickness of the film by the contact thickness meter, its thickness was determined to be approx. 3 μm.
(3) Immobilization Step of Nucleic Acid
After an $O_2$-plasma treatment (direct plasma, gas species: $O_2$, power: 100 W, flow rate: 30 sccm, time: 10 sec) was applied to the substrate having the SU-8 microbead pattern formed thereon to activate the microbead pattern, a (3-glycidoxypropyl) triethoxysilane treatment (vapor phase reaction) was conducted at 120° C. for 10 hours.

Figure 8A:
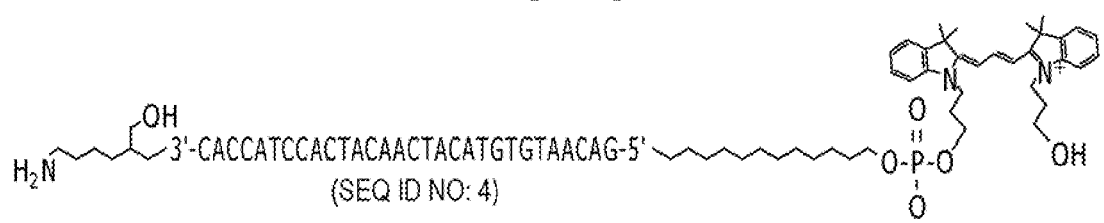
FIGS. 8A and 8C are illustrations of the structures of oligo DNA-1 and oligo DNA-2 separately immobilized on the surfaces of microbeads in Example 4.

The oligo DNA-1 shown in FIG. 8A (see SEQ ID NO: 4 in Table 3) was dissolved at 10 μM in 2×SSC buffer, and in the thus-prepared solution, the substrate which was provided Here, red fluorescence emitted from the cyanine dye Cy3 was observed under the fluorescence microscope, thereby confirming that the oligo DNA-1 was immobilized on the SU-8 microbead regions.
(4) Stripping Step
The silicon substrate with the microbead regions patterned thereon was subjected to ultrasonication at 40° C. for 20 minutes in a fluorinated solvent ("NOVEC™ HFE7300," trade name, product of Sumitomo 3M Limited) which was heated at 75° C. Subsequently, the resulting microbeads were recovered by filtration under reduced pressure, and were then repeatedly rinsed with "NOVEC™ HFE7300" of room temperature and dried.

Figure 8B:
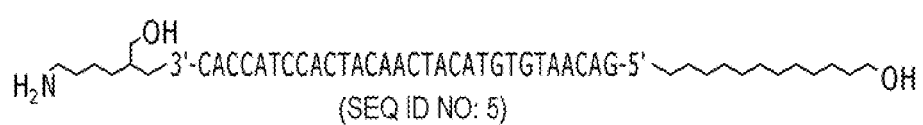
Figure 8C:
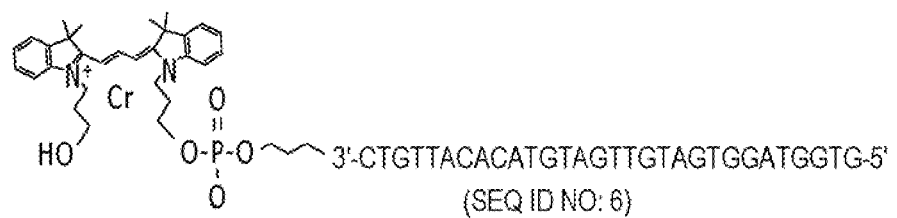

Subsequently, the resultant microbeads were observed under the fluorescence microscope, and red fluorescence emitted from the cyanine dye Cy3 was confirmed. The intensity of fluorescence from the microbeads did not change compared with the intensity of fluorescence from the SU-8 microbead regions before the stripping step. It was, therefore, possible to confirm that no modification, liberation and/or the like of the oligo DNA-1 took place in the stripping step. (5) Isolation of Target Nucleic Acid Chains In the above-described nucleic acid immobilization step, an oligo DNA-2 shown in FIG. 8B (see SEQ ID NO: 5 in Table 3) was immobilized in place of the oligo DNA-1 under similar conditions, and as target nucleic acid chains, the oligo DNA-3 shown in FIG. 8C (see SEQ ID NO: 6 in Table 3) were isolated and detected.

The target nucleic acid chains, the oligo DNA-3, were formulated at 2 μM in 1×SSC aqueous solution. The resulting solution and the microbeads with the oligo DNA-2 immobilized thereon were stirred and mixed at 50° C. for 12 hours. The beads were collected by filtration, and were then rinsed for 20 minutes under stirring in 1×SSC buffer with 0.2 M of SDS contained therein. The microbeads were collected by filtration, spread over a slide glass, and then observed under the fluorescence microscope. As a result, red fluorescence emitted from the cyanine Cy3 was confirmed.

Sacrificial Layer of High Molecular Material "DEFENSA™" as Fluorinated Organic Material
(1) Formation of Sacrificial Layer
After "DEFENSA™" ("7710z-70," trade name, product of DIC Corporation) was spin-coated firstly at 700 rpm for 3 seconds and then at 4,000 rpm for 20 seconds onto an $O_2$-plasma-cleaned silicon substrate (direct plasma, gas species: $O_2$, power: 100 W, flow rate: 30 sccm, time: 10 seconds), an ultraviolet ray from an UV lamp of 170 mW/cm$^2$ (light source: a high-pressure mercury vapor lamp) was irradiated onto the resultant coating for 40 seconds in a glove box, which had been thoroughly purged with nitrogen gas, to optically cure the coating. As a result of a measurement of the thickness of the "DEFENSA™" film by the contact thickness meter, its thickness was determined to be approx. 200 nm.

To provide the sacrificial layer with improved adhesion properties to SU-8, the sacrificial layer was subjected first to an $O_2$-RIE treatment (gas species: $O_2$, power: 70 W, pressure: 18 Pa, flow rate: 10 sccm, time: 15 sec) and then to an $O_2$-plasma treatment (direct plasma, gas species: $O_2$, power: 100 W, pressure: 3 Pa, flow rate: 30 sccm, time: 15 sec).

(2) Patterning Step

In a similar manner as in the above-described case in which "CYTOP™" was used, the film formation and patterning of SU-8 were conducted. In this experiment, however, a maskless exposure system (ultraviolet laser, power: 75 J/cm$^2$) was used as an exposure system.

(3) Modification with Hydroxyl Groups, Water-Repellent Treatment, and Stepwise Syntheses of Nucleic Acids Those modification, treatment and syntheses were conducted as in Example 1.

(4) Stripping Step

The silicon substrate with the microbead regions patterned thereon was stirred under shaking at 80° C. for 30 minutes in the fluorinated solvent ("NOVEC™ HFE7300," trade name, product of Sumitomo 3M Limited) which was heated at 75° C. Subsequently, the resulting microbeads were recovered by filtration, rinsed with a fluorinated inert liquid ("FC-84," trade name, product of Sumitomo 3M Limited) of room temperature, and then dried.

3. Sacrificial Layer of High Molecular Material "TEFLON™ AF" as Fluorinated Organic Material (1) Formation of Sacrificial Layer After "TEFLON™" ("AF 1601 SOL FC," trade name, product of Mitsui-Du Pont Fluorochemical Co., Ltd.) was spin-coated firstly at 500 rpm for 3 seconds and then at 1,500 rpm for 20 seconds onto a UV-ozone-cleaned silicon substrate, the substrate was dried at 50° C. for 10 minutes and then at 165° C. for 10 minutes. As a result of a measurement of the thickness of the "TEFLON™ AF" film by the contact thickness meter, its thickness was determined to be approx. 100 nm.

To provide the sacrificial layer with improved adhesion properties to SU-8, the sacrificial layer was subjected to an $O_2$-RIE treatment (gas species: $O_2$, power: 70 W, pressure: 18 Pa, flow rate: 10 sccm, time: 15 sec).

(2) Patterning Step

In a similar manner as in the above-described case in which "DEFENSA™" was used, SU-8 was formed into a film, and the patterning of the film was conducted by a maskless exposure system.

(3) Immobilization Step of Nucleic Acid

After an $O_2$-plasma treatment (direct plasma, gas species: $O_2$, power: 100 W, flow rate: 30 sccm, time: 10 sec) was applied to the substrate having the SU-8 microbead pattern formed thereon to activate the microbead pattern, a (3-glycidoxypropyl)triethoxysilane treatment (vapor phase reaction) was conducted at 120° C. for 10 hours.

The oligo DNA-1 shown in FIG. 8A (see SEQ ID NO: 4 in Table 3) was dissolved at 10 μM in 2×SSC buffer, and in the thus-prepared solution, the substrate which was provided with the microbeads subjected to the silane coupling treatment was immersed for 12 hours. The substrate was taken out, was rinsed for 15 minutes under stirring in 2×SSC buffer which contained 0.2 M of SDS, and was then rinsed for 5 minutes under stirring in a fresh supply of 2×SSC buffer with 0.2 M of SDS contained therein while being heated at 90° C. The substrate was rinsed for 3 minutes in running water, and was then dried.

Here, red fluorescence emitted from the cyanine dye Cy3 was observed under the fluorescence microscope, thereby confirming that the oligo DNA-1 was immobilized on the SU-8 microbead regions.

(4) Stripping Step

The silicon substrate with the microbead regions patterned thereon was stirred under shaking at room temperature for 12 hours in the fluorinated solvent ("NOVEC™ HFE7300") which was heated at 75° C. Subsequently, the resulting microbeads were recovered by filtration, rinsed with "FC-84" of room temperature, and then dried.

Subsequently, the resultant microbeads were observed under the fluorescence microscope, and red fluorescence emitted from the cyanine dye Cy3 was confirmed. The intensity of fluorescence from the microbeads did not change compared with the intensity of fluorescence from the SU-8 microbead regions before the stripping step. It was, therefore, possible to confirm that no modification, liberation and/or the like of the oligo DNA-1 took place in the stripping step.

4. Sacrificial Layer of Low Molecular Material, 2,4,6-tris (nonadecafluorononyl)-1,3,5-triazine as Fluorinated Organic Material (1) Formation of Sacrificial Layer A 10% solution of 2,4,6-tris(nonadecafluorononyl)-1,3,5-triazine in perfluorotoluene was prepared. After hexamethyldisilazane was spin-coated firstly at 500 rpm for 5 seconds and then at 4,000 rpm for 40 seconds and then at 5,000 rpm for 30 seconds onto an $O_2$-plasma-treated silicon substrate (direct plasma, gas species: $O_2$, power: 100 W, flow rate: 30 sccm, time: 10 seconds), the above-described 2,4,6-tris(nonadecafluorononyl)-1,3,5-triazine solution was spin-coated firstly at 700 rpm for 3 seconds and then at 4,000 rpm for 20 seconds. Subsequently, the thus-coated substrate was dried at room temperature for 2 hours.

(2) Patterning Step

In a similar manner as in the above-described case in which "CYTOP™" was used, the film formation and patterning of SU-8 were conducted. In this experiment, however, a maskless exposure system (ultraviolet laser, power: 75 J/cm$^2$) was used as an exposure system.

Subsequent to development and rinsing, hard baking was conducted at 100° C. for 2 minutes to remove 2,4,6-tris(nonadecafluorononyl)-1,3,5-triazine, which were coated on the surface of the substrate at the regions other than the microbead regions, through sublimation.

(3) Immobilization Step of Nucleic Acid

In a similar manner as in the above-described case in which "CYTOP™" was used, a (3-glycidoxypropyl)triethoxysilane treatment (vapor phase) was conducted at 120° C. for 10 hours, and the oligo DNA-1 was immobilized.

Here, red fluorescence emitted from the cyanine dye Cy3 was observed under the fluorescence microscope, thereby confirming that the oligo DNA-1 was immobilized on the SU-8 microbead regions.

(4) Stripping Step

The silicon substrate with the microbead regions patterned thereon was placed in a vacuum vessel. While reducing the pressure of the vacuum vessel through a 5-μm filter and heating it at 65° C., the substrate was dried for 12 hours in an oven to remove 2,4,6-tris(nonadecafluorononyl)-1,3,5-triazine, which still remained under the microbead regions, through sublimation. As a result, the resulting microbeads were stripped.

Subsequently, the resultant microbeads were observed under the fluorescence microscope, and red fluorescence emitted from the cyanine dye Cy3 was confirmed. The intensity of fluorescence from the microbeads did not change compared with the intensity of fluorescence from the SU-8 microbead regions before the stripping step. It was, therefore, possible to confirm that no modification, liberation and/or the like of the oligo DNA-1 took place in the stripping step.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A process for the preparation of microbeads, comprising:
   patterning a thin film, which has been formed on a substrate, into microbead regions of predetermined shape by photolithography;
   immobilizing a predetermined substance on the patterned microbead regions; and
   stripping off, from the substrate, the patterned microbead regions with the substance immobilized thereon,
   wherein the formation of the thin film is conducted after forming on the substrate a sacrificial layer formed of a fluorinated organic material layer and capable of being physically or chemically etched in the stripping step, and
   wherein in stripping, the patterned microbead regions are removed from the substrate by causing the fluorinated organic material layer to sublimate.

2. The process according to claim 1, wherein before the immobilization step, a water-repellent treatment is applied to substrate regions between the patterned microbead regions.

3. The process according to claim 1, wherein said immobilization step is conducted by chemical synthesis of the substance on the microbead regions.

4. The process according to claim 1, wherein a biological macromolecule selected from a nucleic acid of a predetermined sequence, a peptide or a sugar chain is immobilized as the substance.

5. The process according to claim 1, wherein the thin film has been formed of a photoresist or silicon dioxide.

6. The process according to claim 1, wherein said sacrificial layer is formed by subjecting a surface of the substrate to a treatment with a coupling agent.

7. The process according to claim 1, wherein said sacrificial layer is formed of a metal oxide layer.

8. A microbead composition comprising microbeads obtained by a process for the preparation of microbeads, comprising the steps of:
   patterning a thin film, which has been formed on a substrate, into microbead regions of predetermined shape by photolithography;
   immobilizing a predetermined substance on the patterned microbead regions; and
   stripping off, from the substrate, the thus-patterned microbead regions with the substance immobilized thereon.

9. The microbeads according to claim 8, which have a three-dimensional shape provided with two faces opposing each other and extending substantially in parallel with each other, and the predetermined substance is immobilized on one of the two faces.

10. A process for the preparation of microbeads, comprising:
   patterning a thin film, which has been formed on a substrate, into microbead regions of predetermined shape by photolithography;
   immobilizing a predetermined substance on the patterned microbead regions; and
   stripping off, from the substrate, the patterned microbead regions with the substance immobilized thereon,
   wherein the formation of the thin film is conducted after forming on the substrate a sacrificial layer formed of a fluorinated organic material layer and capable of being physically or chemically etched in the stripping step, and
   wherein in stripping, the patterned microbead regions are removed from the substrate by dissolving the fluorinated organic material layer with a fluorinated solvent.

* * * * *

SEQUENCE LISTING

```
<160> NUMBER OF SEQ ID NOS: 6

<210> SEQ ID NO 1
<211> LENGTH: 20
<212> TYPE: DNA
<213> ORGANISM: Artificial
<220> FEATURE:
<223> OTHER INFORMATION: Synthesized nucleic acid sequence of the
      oligonucleotide for region A

<400> SEQUENCE: 1
gagaacgatc ttcagggtgc                                              20

<210> SEQ ID NO 2
<211> LENGTH: 20
<212> TYPE: DNA
<213> ORGANISM: Artificial
<220> FEATURE:
<223> OTHER INFORMATION: Synthesized nucleic acid sequence of the
      oligonucleotide for region B

<400> SEQUENCE: 2
cgatctaggt actgcaagta                                              20

<210> SEQ ID NO 3
<211> LENGTH: 26
<212> TYPE: DNA
<213> ORGANISM: Artificial
<220> FEATURE:
<223> OTHER INFORMATION: Synthesized nucleic acid sequence of the
      target oligonucleotide

<400> SEQUENCE: 3
ctacctgcac cctgaagatc gttctc                                       26

<210> SEQ ID NO 4
<211> LENGTH: 30
<212> TYPE: DNA
<213> ORGANISM: Artificial
<220> FEATURE:
<223> OTHER INFORMATION: Synthesized nucleic acid sequence of oligo
      DNA-1

<400> SEQUENCE: 4
gacaatgtgt acatcaacat cacctaccac                                   30

<210> SEQ ID NO 5
<211> LENGTH: 30
<212> TYPE: DNA
<213> ORGANISM: Artificial
<220> FEATURE:
<223> OTHER INFORMATION: Synthesized nucleic acid sequence of oligo
      DNA-2

<400> SEQUENCE: 5
gacaatgtgt acatcaacat cacctaccac                                   30

<210> SEQ ID NO 6
<211> LENGTH: 30
```

-continued

```
<212> TYPE: DNA
<213> ORGANISM: Artificial
<220> FEATURE:
<223> OTHER INFORMATION: Synthesized nucleic acid sequence of oligo
      DNA-3

<400> SEQUENCE: 6
gtggtaggtg atgttgatgt acacattgtc                                         30
```